TELEGRAPH TRANSMITTER CONTROL CIRCUIT

Filed Oct. 11, 1965

INVENTOR
ROBERT E. ARKO

BY R. C. Terry
ATTORNEY

United States Patent Office 3,420,948

Patented Jan. 7, 1969

3,420,948

TELEGRAPH TRANSMITTER CONTROL CIRCUIT

Robert E. Arko, Mount Prospect, Ill., assignor to Teletype Corporation, Skokie, Ill., a corporation of Delaware Filed Oct. 11, 1965, Ser. No. 494,450
U.S. Cl. 178—4.1 6 Claims
Int. Cl. H04l *15/04;* H04b *7/00;* H04b *1/40*

ABSTRACT OF THE DISCLOSURE

A transmitter control circuit activated by transmission of a predetermined code combination for disabling a transmitter and thereby preventing further transmission and activated by a break-make signal received from a receiving device for enabling the transmitter and thereby reinitiating transmission.

This invention relates to a transmitter control circuit and more particularly to a relay circuit for interrupting the operation of a telegraph transmitter and for placing the restarting of the transmitter under control of the device to which the transmitter is sending.

In this field of telegraphic communications it is frequently desirable to halt transmission from a sending station while a receiving station carries out some function, such as tabulation, form feed, tabulating card ejection, etc., which requires an indefinite amount of time depending on the position of the stationery, etc. in the receiving device at the time the function is commenced. If both stations have independent transmitting and receiving facilities, the sending station can be controlled easily by sending signals from the receiving station over a second telegraph line. If, however, the sending station has a transmitter only and the receiving station has a receiver only, control of the transmitter is more difficult and usually is accomplished by placing the transmitter under control of a timer which interrupts transmission for a period of time equal to the maximum amount of time a given function could take. This approach is adequate for functions requiring a fixed amount of time but is very wasteful of time for functions requiring a variable or indefinite amount of time, especially if those functions are frequently carried out.

Accordingly, an object of this invention is to provide a new and improved circuit for controlling the operation of telegraph transmitters.

Another object of this invention is to provide a transmitter control circuit which interrupts transmitter operation until a function of indefinite duration has been performed.

A further object of this invention is to provide a transmitter control circuit which receives a signal indicating completion of a function over the transmission line.

According to the preferred embodiment of the invention these and other objects are achieved by providing a transmitter control relay which is energized upon transmission by the transmitter of a predetermined character and which, upon energization, disables the transmitter and removes a shunt from a signal receiving line relay. The line relay monitors the transmission line which extends from the sending station to the receiving station. When a break-make signal from the receiving station appears on the transmission line, the line relay operates a disabling relay which causes the control relay to be deenergized. This in turn causes transmission to recommence.

A more complete understanding of the invention may be had by referring to the following detailed description in conjunction with the drawing wherein.

Figures 1, 2, 3, 4:
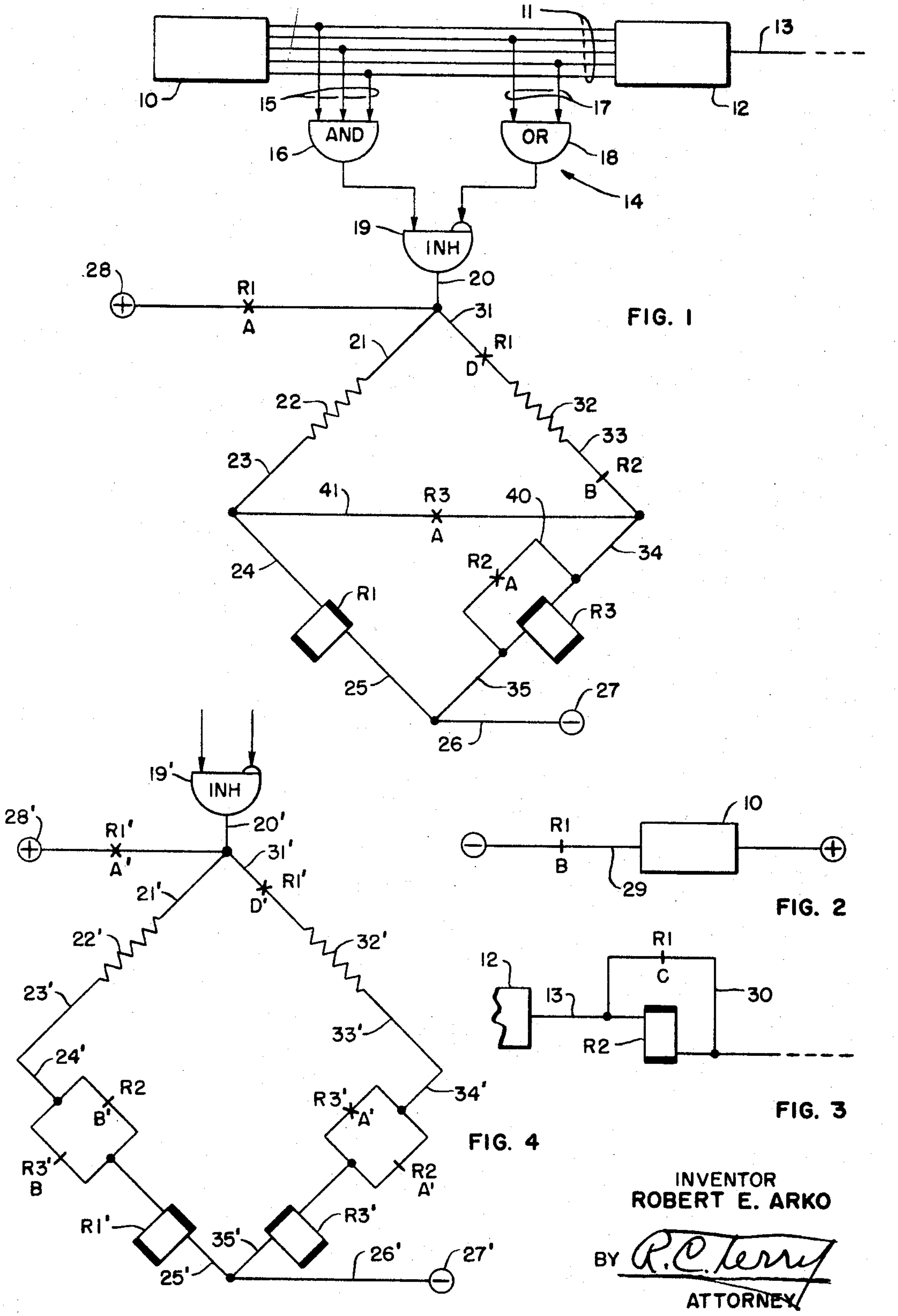
FIG. 1 is a schematic illustration of a circuit employing the invention.
FIGS. 2 and 3 are partial schematic illustrations of circuits controlled by either the circuit shown in FIG. 1 or the circuit shown in FIG. 4.
FIG. 4 is a schematic illustration of an alternate embodiment of the circuit shown in FIG. 1.

Referring now to the drawing, wherein like reference numerals represent like parts throughout the several views, there is shown a relay circuit for controlling the operation of a telegraph transmitter. In the drawing relays are denoted by the symbol R followed by a numeral and contacts operated by the relay are labeled with the symbol of the relay which operates the contact and a letter symbol denoting the contact. For example, a typical contact might be labeled R1–C indicating that the contact is operated by relay R1 and that the contact is the C contact of that relay. In all cases normally open or make contacts which are closed by the operation of a relay are illustrated by a cross (X) in the conductor at the place where they affect the current flow through the conductor. Normally closed or break contacts which are opened by the operation of a relay are illustrated by a perpendicular line or bar (|) in the conductor at the place where they affect the current flow through the conductor.

Referring now to FIG. 1 there will be seen a transmitter 10 which reads permutation code combinations in record storage media and transmits the information read from the media in parallel fashion over a plurality of leads 11, equal in number to the total number of elements in the code being transmitted, to a distributor 12. The distributor 12 accepts the information transmitted from the transmitter 10 and serializes the information onto a telegraph line 13. Both the transmitter 10 and the distributor 12 may be of any of the commonly known types.

A code combination monitoring circuit 14 is attached to the plurality of leads 11 between the transmitter 10 and the distributor 12 and serves to detect the transmission by the transmitter 10 of a predetermined code combination. A plurality of mark sensing leads 15 are individually attached to predetermined ones of the plurality of leads 11. The mark sensing leads 15 extend to an AND-gate 16 which produces an output if all of the leads 11 to which the mark sensing leads 15 are attached are in a marking (current) condition. Similarly, a plurality of space sensing leads 17 are provided for determining whether the leads of the plurality of leads 11 to which the mark sensing leads 15 are not attached are in spacing condition. The space sensing leads 17 extend to an OR-gate 18 which produces an output if any of the space sensing leads 17 senses a mark. The outputs of the AND-gate 16 and of the OR-gate 18 extend to an inhibit gate 19 which allows the output of the AND-gate 16 to pass and thereby produces a positive output signal unless it receives a pulse or signal from the OR-gate 18 in which event the output from the AND-gate 16 is blocked and the inhibit gate 19 produces no output. It should be apparent that by properly selecting to which of the plurality of leads 11 the mark sensing leads 15 and the space sensing leads 17 are connected, any possible code combination can be selected and, once selected, only this code combination will produce an output from the inhibit gate 19.

An output from the inhibit gate 19 causes operation of a transmitter control relay R1 by connecting a positive potential to a circuit including a lead 20, a lead 21, a resistor 22, a lead 23, a lead 24, the relay R1, a lead 25, a lead 26 and a negative potential 27. Upon operating relay R1 closes its normally open make contact R1–A and thereupon forms a holding circuit for the relay R1 extending from a positive potential 28, through the now-closed make contact R1–A, the lead 21, the resistor 22, the leads 23 and 24, the relay R1 and the leads 25 and 26 to the negative potential 27.

Operation of relay R1 also causes, as is shown in FIG. 2, the opening of the normally closed break contact R1–B which breaks the activating circuit 29 for the transmitter 10. This disables the transmitter 10 and prevent further transmission over the signal line 13.

Referring now to FIG. 3 it is seen that the operation of relay R1 opens the normally closed break contact R1–C and thereupon removes a shunt from around a signal receiving line relay R2 in the transmission line 13. This allows relay R2 to respond to signals present on the telegraph line 13 which extends from the distributor 12 to a remote receiving device. Since the operation of relay R1 has stopped transmission by opening the contact R1–B in the line 29, the telegraph line is in its rest condition which is a marking or current state. Thus, upon removal of the shunt 30 from around the relay R2, the relay operates.

Operation of relay R1 also causes the normally open make contact R1–D to close. This completes a circuit extending from the positive potential 28 through a lead 31, a resistor 32, a lead 33, a lead 34, a shunting or disabling relay R3, a lead 35, and the lead 26 to the negative potential 27. This circuit would cause relay R3 to operate except that relay R3 is a slow operating relay with respect to relay R2 and therefore does not operate within the time required for relay R2 to close its normally open make contact R2–A which connects a shunt 40 around relay R3 and thereby prevents the operation of relay R3. Operation of relay R2 also opens a normally closed break contact R2–B which prevents current from flowing through the shunt circuit 40.

All of the above described operations take place upon recognition by the monitoring circuit 14 of the transmission by the transmitter 10 of the predetermined code combination. The state of the circuit at this time is as follow: Relay R1 is operated and therefore, the transmitter 10 is disabled; relay R2 is operated and therefore, relay R3 is not operated due to the shunt 40. This state continues until a break-make signal combination is detected on the signal line 13 by signal receiving relay R2.

The break-make signal combination is generated by the receiving device at the termination of a function which was initiated by the transmission over the signal line 13 of the same code combination which activated the monitor circuit 14. This function can be one of indefinite length so that the disabling of the transmitter continues for a period of time which cannot be predicted in advance. The receiving mechanism, however, is provided with circuitry for recognizing completion of the function, which circuitry is used to temporarily open the line 13 and thereby signal the transmitter to recommence transmission.

When the signal line 13 is opened by the receiving device, relay R2 releases thus reopening contact R2–A and reclosing contact R2–B. This allows current to pass from positive potential 28 through the now closed contact R1–A, the lead 31, the now closed contact R1–D, the resistor 32, the lead 33, the contact R2–B, the lead 34, the shunting relay R3, the lead 35, and the lead 26 to the negative potential 27 to operate relay R3. Upon operating, relay R3 closes its normally open make contact R3–A thereby setting up a shunting circuit by connecting a lead 41 across the end points of leads 24 and 34. Nothing happens upon closure of the contact R3–A, however, because resistors 22 and 32 are purposely made identical as are the resistances of the winding of relays R1 and R3. Therefore, the circuit shown in FIG. 1 forms a balanced bridge, and no current flows in the lead 41.

After a break condition of sufficient duration to allow operation of relay R3 has been applied to the line 13 by the receiving device, the normal rest condition of marking or current is reinitiated in the line 13 by the receiver. This causes relay R2 to operate thereby opening contact R2–B and closing contact R2–A. This prevents current from flowing in the lead 33 and re-establishes the shunt around relay R3 through the shunt 40. The re-operation of relay R2, however, not only shunts relay R3 through shunt 40 as it did when the circuit was first activated, but also shunts relay R1 through a path including the lead 41, the now-closed contact R3–A, the lead 34, the shunt 40 and the lead 35. It should be noted that this shunting path includes the shunt around relay R3.

The simultaneous application of shunting paths across both of the relays R1 and R3 causes them to release. They may release simultaneously, although preferably the release characteristic of relay R3 is slow relative to that of relay R1. Accordingly, as relay R3 de-energizes and thereby opens its contact R3–A removing the shunt from relay R1, relay R1 also releases or has already released, thus opening its contact R1–A thereby disconnecting the positive potential 28 from the circuit. Since the transmitter 10 previously has been stopped by the opening of the contact R1–B of relay 1, the monitoring circuit 14 is not actuated; and, accordingly, no power is available to re-operate relay R1. Thus, the simultaneous shunting of relays R1 and R3 causes both relays to release. This in turn re-applies the shunt 30 around the relay R2 by closure of the contact R1–C thereby causing that relay to release. At the same time, the contact R1–B is closed thus re-applying power to the transmitter 10 over the line 29. This causes transmission to recommence and returns the circuit to its starting condition.

Referring now to FIG. 4 there is shown a circuit which may be substituted for the circuit shown in FIG. 1 to control the transmitter 10. The circuit shown in FIG. 4 operates on the partial circuits shown in FIGS. 2 and 3 in the same way the circuit shown in FIG. 1 operates on these circuits. Where ever possible the same reference numerals are employed in FIG. 4 as are employed in FIG. 1, however, the reference numerals employed in FIG. 4 are marked with a prime.

Operation of the circuit in FIG. 4 commences from a detection by the monitoring circuit 14 of a predetermined code combination as described previously. This causes an inhibit gate 19′ to apply a positive potential over a lead 20′, a lead 21′, a resistor 22′, a lead 23′, a lead 24′ either of a pair of normally closed contacts R2–B′ and R3′–B, a transmitter control relay R1′, a lead 25′ and a lead 26′ to a source of negative potential 27′. This causes relay R1′ to operate which in turn causes a holding circuit to be formed by connecting a positive potential 28′ to the circuit just described through the now closed contact R1′–A′.

Operation of relay R1′ also removes the shunt from around the signal receiving line relay R2 in the manner described in connection with the circuit shown in FIG. 1, and thus causes relay R2 to operate. Operation of relay R2 opens a normally closed contact R2–A′ which opens the operating circuit for relay R3′. As in the embodiment shown in FIG. 1, relay R3′ should be sufficiently slow-to-operate that it does not operate through the contacts R1′–D′ before contacts R2–A′ open. Operation of relay R2 also opens contact R2–B′ but does not allow relay R1′ to release since the positive potential 28′ is still connected to the relay R1′ through the contact R3′–B. The circuit remains in this condition, that is, with relays R1′ and R2 operated and relay R3′ not operated until a break signal is received from the receiving device.

Upon receipt of a break signal on the line 13, relay R2 releases. This recloses the contacts R2–A′ and R2–B′ thus allowing relay R3′ to operate through a circuit extending from the positive potential 28′, through the now closed contact R1′–A′, the lead 31′, the now closed contact R1′–D′, the resistor 32′, the lead 33′, the lead 34′, the contact R2–A′, the relay R3′, the lead 35′, and the lead 26′ to the negative potential 27′. Upon operation relay R3′ closes its normally open contact R3′–A′ thus providing a holding circuit for itself and opens its normally closed contact R3′–B. This does not cause relay R1′ to release since contact R2–B′ is closed by the release of relay R2. Accordingly, during the break signal both relay R1′ and relay R3′ are operated; however, relay R2 is released since there is no current in the signal line 13.

Upon receipt of the marking or current signal on the line 13 from the receiving device relay R2 operates. This operation does not immediately effect release of relay R3′ since the holding path including contact R3′–A′ has been set up to keep relay R3′ operated. The re-operation of relay R2 does effect the release of relay R1′, however, by opening the contact R2–B′. Since contact R3′–B is being held open by relay R3′ this causes a break in the holding path for relay R1′.

Upon release relay R1′ opens the contact R1′–A′ and thereby disconnects the positive potential 28′ from the circuit. Since the monitoring circuit 14 is no longer sensing the predetermined code combination on the output conductors 11 of the transmitter 10, the removal of the positive potential 28′ from the circuit disables relay R3′. At the same time relay R2 is reshunted through the shunt circuit 30 (FIG. 3) by closure of the contact R1′–C and contact R1′–B (FIG. 2) is reclosed thereby reinitiating operation of the transmitter. It thus should be apparent that the circuit shown in FIG. 4 performs the same function performed by the circuit shown in FIG. 1 in that it operates upon transmission of a predetermined code combination and upon operation it prevents further transmission until a break-make signal is received from the receiving device.

What is claimed is:

1. A circuit for controlling the operation of a telegraph transmitter which transmits telegraph signals over a signal line to a remote device including:

- means for monitoring the output of the transmitter and for producing an output when a predetermined code combination is transmitted by the transmitter;
- normally disabled signal receiving means for receiving signals from the remote device;
- transmitter control means responsive to the output of the monitor means for disabling the transmitter and for making the signal receiving means operative; and
- disabling means for operation upon receipt by the signal receiving means of a predetermined combination of signals for disabling the transmitter control means.

2. The circuit according to claim 1 wherein the signal receiving means is a normally shunted relay which operates when the shunt is removed and which operates the disabling means when a break-make signal appears on the signal line.

3. The circuit according to claim 1 wherein the transmitter control means is a relay which is operated by the output of the monitoring means and which, upon operation, closes a holding circuit for itself and wherein the disabling means disables the transmitter control means by disabling the holding circuit.

4. A circuit for controlling the operation of a telegraph transmitter including:

- a normally disabled transmitter control relay operated in response to transmission by the transmitter of a predetermined code combination and, upon operation for disabling the transmitter;
- a normally disabled signal receiving line relay prepared for operation by the transmitter control relay for receiving signals of two types; and
- a normally disabled disabling relay prepared for operation in response to receipt by the signal receiving relay of a signal of a first type and upon receipt by the signal receiving relay of a signal of the second type, operated to disable the transmitter control relay thereby reinitiating transmission.

5. A device for controlling the operation of a telegraph transmitter which transmits code combinations over a signal line including:

- means for monitoring the operation of the transmitter and for disabling the transmitter upon transmission of a predetermined code combination, and
- means for monitoring the signal line whenever the transmitter is disabled and for disabling the monitoring and disabling means in response to a predetermined signal on the signal line.

6. The device according to claim 5 wherein the transmitter includes power means for operating the transmitter, wherein the monitoring and disabling means separates the power means from the transmitter thereby stopping the transmitter and wherein the signal line monitoring means disables the monitoring and disabling means thereby reconnecting the power means to the transmitter and restarting the transmitter.

References Cited

UNITED STATES PATENTS

| | | | |
|---|---|---|---|
| 2,669,602 | 2/1954 | Salmon et al. | 178—2 |
| 2,912,485 | 11/1959 | Kaufman et al. | 178—4.1 |
| 3,230,509 | 1/1966 | Spencer | 340—152 |

THOMAS A. ROBINSON, *Primary Examiner.*

U.S. Cl. X.R.

317—153; 325—022; 340—163, 408; 343—226